Aug. 25, 1964 G. T. RANDOL 3,145,625
CONTROL VALVE ADAPTED FOR PRESSURE DIFFERENTIAL MOTOR USE
Original Filed Sept. 2, 1958 4 Sheets-Sheet 2

*Inventor*

Aug. 25, 1964     G. T. RANDOL     3,145,625
CONTROL VALVE ADAPTED FOR PRESSURE DIFFERENTIAL MOTOR USE
Original Filed Sept. 2, 1958     4 Sheets—Sheet 3

Inventor

Inventor

United States Patent Office 3,145,625
Patented Aug. 25, 1964

3,145,625
CONTROL VALVE ADAPTED FOR PRESSURE DIFFERENTIAL MOTOR USE
Glenn T. Randol, P.O. Box 275, 2nd Ave. and Paull St., Mountain Lake Park, Md.
Original application Sept. 2, 1958, Ser. No. 758,405. Divided and this application May 4, 1961, Ser. No. 107,747
12 Claims. (Cl. 91—374)

This application is a division of my copending application Serial No. 758,405, filed September 2, 1958, abandoned in favor of continuing application Serial No. 122,037, filed July 5, 1961, now issued to Patent No. 3,072,106, dated January 8, 1963.

In my original application referred to, I have disclosed a vacuum-operated booster motor having a casing with a power member or wall movable therein, and which is adapted to operate in part the hydraulic master cylinder of hydraulic brake systems on automotive vehicles and the like. Activation and inactivation of said power member being under control of novel and improved follow-up valve mechanism comprising at least two principal co-operating elements which are relatively displaceable from normal "off" position wherein the motor is inactivated, to operating "on" position wherein the motor is activated, under influence of an operator-operated member opposed by resistance (work load) reacting on said power member, said valve mechanism also including a separate auxiliary air control valve radially offset from the axis thereof and controlled conjointly by said operator member to co-operate with said "off" position to expedite incursion of air into the vacuum-power chamber of said motor for rapid return of the power member to its normally released position wherein the brakes are "off." There are certain features of construction and operation which relate particularly to the valve mechanism per se, thus rendering such mechanism applicable for controlling motors of the type under consideration in operative association with systems and/or devices other than those which characterize vehicular brake systems. These features of the valve mechanism per se form the subject-matter of the present application.

The present invention has for a primary object, the provision of new and improved follow-up valve mechanism operable from said operator member to control operative energization of said motor, said valve mechanism comprising at least two principal cooperating elements, one of which slidably interfits the other and adapted to operatively support the valve mechanism as a unit on the motor casing independently of said power member, and an auxiliary air control valve incorporated in the power member in radially offset disposition with respect to the axis of the interfitting elements aforesaid for control by said operator member in synchronism with the interfitting elements whereby incursion of air into the motor power chamber is expedited to accelerate return movement of the power member to normal position.

An object related to the above primary object is to provide novel control valve mechanism for servomotors and the like, wherein said interfitting elements are coaxially disposed with respect to each other and to said power member, and which are adapted to selectively balance pressures on opposite sides of the power member for power-inactivation of said servomotor, and establish differential pressures on opposite sides of the power member for power-activation of said servomotor, said valve mechanism including an auxiliary valve incorporated in the power member in radially offset disposition with respect to the axis of the latter member, for cooperating with the "off" disposition of said interfitting elements to effect said balanced pressures for the purpose.

A more specific object of the invention is to provide new and improved follow-up valve mechanism comprising a pair of telescopically-related cylindrical elements for controlling a source of sub-atmospheric (negative) pressure, and a poppet-type element for controlling atmospheric pressure, said pair of elements and the poppet element being selectively controllable by said operator member to establish equivalent pressures within the motor casing on opposite sides of the power member for power-inactivation of the motor and to establish differential pressures therein on opposite sides of the power member for power-activation of said motor, respectively.

An object related to the above specific object is the provision of novel mechanical interconnecting means between one of the pair of elements and said poppet element to enable conjoint movement thereof to open said poppet element thereby interconnecting opposite sides of said power member to balance pressures thereagainst, said poppet element including a normally preloaded spring biasing the same to closed position in synchronism with opening of said pair of elements to "on" position to produce differential pressures on opposite sides of the power member.

Another object related to the two specific objects above is to provide a mechanical link between said operator-operated member and one of said pair of elements to control said pair of elements and the poppet element, and whereby direct actuation of the power member may be effected in the event of power inadequacy or failure notwithstanding the said pair of elements and operatively associated poppet element are in actuated dispositions corresponding to power-activation of the power member.

Another object of the invention is to provide said pair of coaxial elements with novel spring means to separate them to their normal disposition wherein the booster motor is inactivated, said means including manually adjustable mechanism to selectively establish the desired normally preloaded condition thereof.

Another object of the invention is to utilize in a novel manner a flexible conduit to interconnect the power member with the side of the pair of elements opposite to that connected with another flexible conduit leading to the source of pressure.

The invention, therefore, provides novel auxiliary or vacuum relief valve means operably incorporated in the power member for venting the vacuum-power chamber of a brake booster motor to atmosphere via the atmospheric chamber in said motor in cooperation with a restricted air-vacuum opening in the main control valve means comprising said two interfitting coaxial elements to enable quick release of the power member irrespective of the mode of brake-pedal manipulation so that brake release keeps pace with the rate of withdrawal of foot pressure from the pedal, said restriction of the air-vacuum opening providing the advantage of effecting gradual excursion of air from the vacuum-power chamber for smoothly controlling energization of the booster motor while said restriction inherently retards incursion of air into said vacuum-power chamber with corresponding slow release of the power member when taking the brakes "off" despite quick removal of foot pressure from the brake-pedal. Therefore, the relief valve means serve the important and useful purpose of enabling brake release in synchronism with the rate of brake-pedal return movement according to the rapidity with which pressure is removed from the latter.

A further optional feature provided by the present invention is a novel mechanical connection between the inner of the pair of valve elements and the associated power member controlled thereby, wherein the connected elements and power member have axial movement as a unit with limited radial "floating" movement therebetween to prevent binding and/or wear on the operating parts which could result to an excessive degree should the connection between the power member and inner valve element not provide for radial deflections therebetween. Thus, this connection eliminates need for critical tolerances to maintain coaxial exactness between the power member and valve mechanism therefor since these two components are capable of limited lateral displacement relative to each other without hindering their free axial movement as a unit.

With these and other objects and advantages in view, the invention consists of the new and novel combinations, constructions and arrangements of parts as hereinafter more fully described, set forth in the claims appended hereto, and disclosed in the accompanying drawings forming part hereof, wherein:

Referring now to the drawings wherein like reference characters designate like and corresponding parts throughout the several views, except in a modified embodiment of the invention wherein similar parts are distinguished, however, by the addition of the letter "a" to each, the illustrative embodiments are disclosed in operative association with a pressure differential operated booster motor disclosed herein as a vacuum-operated motor or power cylinder designated as a whole VM of the air-suspended type, and having a cylindrical casing formed with two cup-shaped shells 40, 41 connected as by bolts 53 projecting through complemental outturned flanges which terminate the open ends of the shells, the opposite ends thereof being closed by integral walls 11, 34 respectively as shown, said casing being fitted with a power member assembly or wall designated as a whole PA movable therein from a normally released position to operate in part the master cylinder MC in the conventional hydraulic brake system on automotive vehicles or the like, said power assembly dividing the interior of said casing into a variable pressure (vacuum) chamber 45 and a constant pressure (atmospheric) chamber 46.

The power assembly PA comprises a pair of circular plates 47, 48 and a ring-like flexible diaphragm generally designated D. The inner marginal portion of the diaphragm being clamped between the peripheral marginal portions of said plates, and the outer marginal portion of the diaphragm being anchored in airtight sealed relationship between the casing flanges as shown. The central portions of the assembled plates 47, 48 are reinforced by circular thrust plates 55, 56 respectively, and a circular spacer plate 58 disposed in a coaxial opening 49 in the plate 47 between plates 55 and 48. The aforesaid plates and the diaphragm are assembled as a unit by suitable fasteners projecting therethrough such as illustrated at 57. A central circular opening 68 is provided in the thrust plate 56 for an important purpose to become apparent.

A cylindrical pilot element or stem 70 provided with an annular flange 71 is coaxially fixed to the forward side of the thrust plate 55 for slidably supporting one end of a thrust-transmitting member or plunger 77 in normally engaged relationship with said stem, the other end of said plunger being adapted to engage the master cylinder piston to actuate the same as shown. Slidably mounted on the flange 71 is a centrally apertured cup-shaped spring seat member 95 which is mechanically interconnected with one element of the novel control valve mechanism hereinafter to be described in detail, for movement as a unit by a plurality of actuating pins 64 radially offset from the axis of the power diaphragm assembly PA and operably projecting therethrough in sealed relation. A normally preloaded compression spring 102 encircles a portion of the plunger 77 and reacts between the forward end wall 11 of the motor casing and said spring seat member to urge the latter, the power assembly PA and said one element of the valve mechanism in a releasing direction only to inactivate said booster motor.

Incorporated between the one end of the plunger 77, and the peripheral flange 101 of the spring seat member 95 and the stem flange 71, is a novel reaction device generally designated RD, said device comprising a plurality of radially disposed levers which levers may be integrated to produce a circular disc, or the latter perforated to form individual levers as shown in the parent application, characterized by resiliency or optionally by rigidity, said levers being adapted to transmit progressively increasing reaction from the master cylinder MC when the latter is operating to pressurize the fluid therein, to the operator member in cooperation with the biasing effect of the spring 102 thereby providing the operator with physical awareness of the degree of braking pressure in effect.

The follow-up control valve mechanism generally designated CV is of new and improved construction and operation and comprises: two principal components; namely, a main air-vacuum valve CV for controlling incursion and excursion of air into and from the vacuum-power chamber 45, and an auxiliary air valve AV operatively correlated with the air control function of said main control valve to balance pressures in said motor chambers 45, 46 and thereby accelerate the releasing movement of the booster motor VM and therefore the vehicle brakes in accordance with the rapidity with which foot pressure is removed from the operator-operated member disclosed herein as a brake-pedal designated P of the suspended-type, and which comprises a pedal arm 35 pivotally suspended from its upper end on the vehicle at 36, and the lower end of said arm terminating as a foot pad 37 whereby the operator may exert effort on the pedal P to operate the same. A push-rod PR is pivotally connected at 38 to an intermediate point on the pedal arm to act on the said one element of the main control valve CV to control the same in a novel manner.

The main control valve CV is similar in construction and operation to that disclosed in my prior copending application Serial No. 684,946, filed September 19, 1957, now Patent No. 3,101,032, and which comprises: an outer and an inner telescopically-related element 105, 106 which are disclosed herein as a cylindrical valve sleeve and a valve piston respectively. The valve sleeve 105 is provided with a longitudinal bore 107 extending from its inner end to substantially a medial point therein and a reduced coaxial bore 108 extending from the other end to such depth as to provide a thrust wall 109 between said bores. Spaced from the inner end of the valve sleeve is a vacuum-slot 110 through the wall thereof communicating with the bore 107, and longitudinally spaced rearwardly from said slot 110 is a fluid-control slot 111 through the wall of the valve sleeve in a diametrically disposed relationship and communicating with the said bore 107. An internal annular groove 114 is provided in the surface of the bore 107 adjacent the inner end of the valve sleeve.

Figures 2, 9:
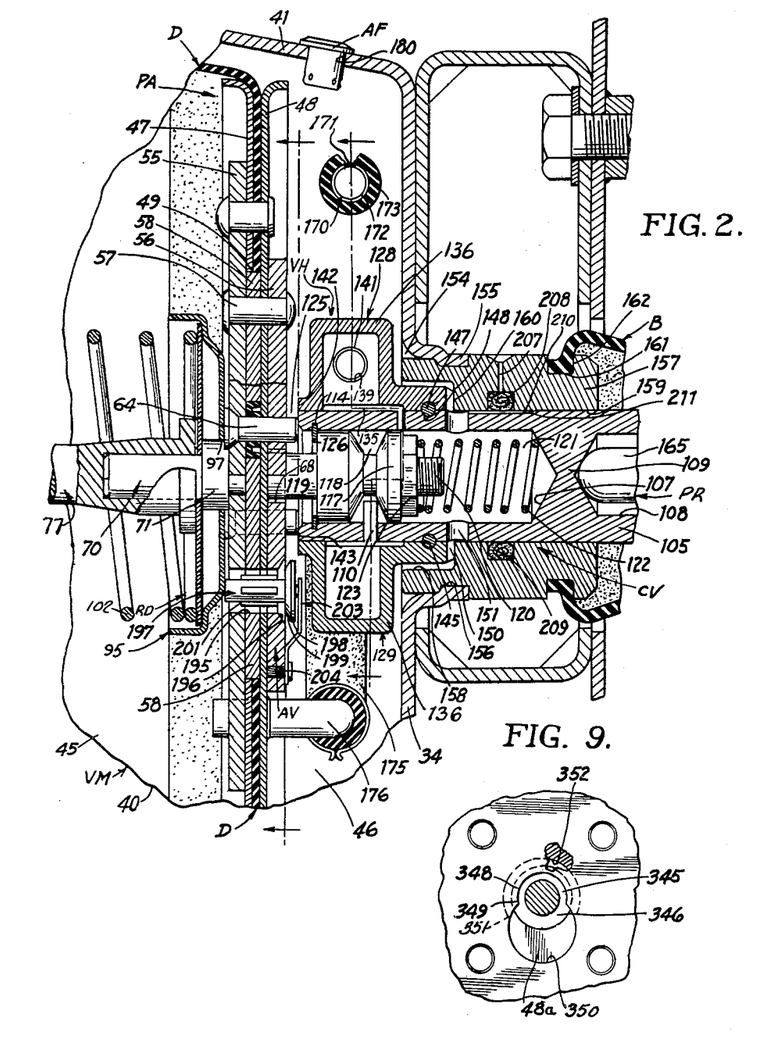
FIGURE 2 is a fragmentary view of FIGURE 1 on an enlarged scale of the valve mechanism per se with certain parts shown in elevation.
FIGURE 9 is a transverse sectional view of FIGURE 8 taken along the line 9—9 thereof to show further details of the mechanical coupling arrangement between the valve piston and power member.

The valve piston 106 is a spool-type element comprising a pair of longitudinally spaced annular lands 116, 117 which define a ring-like vacuum chamber 118 therebetween in continuous communication with the vacuum-slot 110, the outer opposite ends of said lands terminate in reduced diameter cylindrical extensions 119, 120 respectively. The cylindrical surface of the extension 120 is threaded and the free end of the extension 119 is loosely piloted in the opening 68 in plate 56 aforesaid to maintain substantially coaxial relationship between the control valve mechanism and the movable power assembly PA, and also to enable the end of extension 119 to engage the confronting surface area on the plate 48, and thereby move as a unit to produce the usual follow-up action requisite for operation of the main control valve means CV provided by the relative movement therein to effect opening and closing of the control-slot 111. The valve land 117 is spaced from the thrust wall 109 to provide an atmospheric chamber 121 therebetween selectively connectible to the control-slot 111, said land being termed a "working" land because it is operative to selectively connect the control-slot 111 to the vacuum valve chamber 118 and to the atmospheric chamber 121, said vacuum valve chamber being subject to vacuum (negative pressure) at all times when the engine is running via the vacuum-slot 110, such sub-atmospheric conditions being generated, for example, in the engine inlet-manifold (not shown) as a vacuum source. Operably disposed in the valve chamber 121 is a normally preloaded compression spring 122 having one end bearing on the thrust wall 109 and the other end piloted on the reduced threaded extension 120 to react on the confronting face of a preferably hex-type nut 123 threaded onto said extension to normally engage the end of the valve land 117, said nut being capable of manual adjustment along the extension to increase or decrease the tension on spring 122 and thereby vary the degree of shoe-to-drum contact during the initiatory brake-applying stroke. This spring is effective to separate the valve piston and sleeve and accommodate their movement toward each other within the limits of the relative operating movement shown at 125 normally obtaining between the inner end of the valve sleeve 105 and confronting surface area on the thrust plate 56 to enable the valve elements to move relatively to each other to control operative energization of the power assembly PA. A split retainer ring 126 engages the groove 114 for engagement by the peripheral outer face portion of the valve land 116 to establish the normal separated status of the main valve elements under influence of the spring 122 as shown in FIGURE 2, and wherein the relative operating disposition of the valve sleeve is shown with respect to the thrust plate 56 in readiness for a valve operating cycle as will appear.

Encircling the forward portion of the valve sleeve 105 is a valve housing generally designated VH and comprising a pair of interchangeable semicircular segments 128, 129 clamped around this portion in air-tight sealed relation by a pair of hex cap screws 130 oppositely projecting through holes 131 in a pair of laterally extending flanges or ears 132 which terminate opposed arcuate portions of said segments, into threaded holes 133 through complemental lateral flanges or ears 134 which terminate the other opposed arcuate portions of said segments to thus tightly clamp the two halves 128, 129 of the valve housing VH on the valve sleeve 105 to provide a unitary assembly thereof. Formed in the inner curved surface of each of the segments 128, 129 is a rectangular-shaped arcuate cavity 135, with cavity in the upper segment 128 having continuous communication with the cross-slot 111 and the other segment 129 having continuous communication with the vacuum-slot 110 via the cavity 135 thereof. Aligned with the cavity in the upper segment 128 is a rectangular-shaped upstanding embossment or boss 136 integral with the circular wall of said segment, and there is a similar embossment or boss depending from the circular wall of the lower segment 129. Each of said embossments is provided with a vertical hollow or passageway 138 which communicates with the cavities aforesaid, and a substantially horizontal passageway 139 continuously communicates with each of said hollows. A rigid tubular fitting 141 is pressed at one end into each of the passageways 139 to provide a vacuum inlet into the interior of the main control valve CV, and an air-vacuum connection from said valve respectively as will appear. The inner ends 142 of the semicircular walls of the segments 128, 129 in assembled relation terminate flush with the inner end of the valve sleeve 105 to provide a circular working face 143 which continuously engages the ends of the pins 64 projecting through the movable power assembly PA whereby movement of the valve sleeve actuates said pins which in turn simultaneously move the spring seat member 95 disposed adjacent the opposite side of the power assembly PA best demonstrated in FIGURE 2. The aforesaid working face is predeterminately spaced normally from the confronting face area on the plate 56 to establish the relative operating movement of the main control valve means CV whereby movement of the valve sleeve 105 to open the control valve means CV actuates the pins 64 relatively to the diaphragm plates 55, 56 to move the spring seat 95 forwardly away from the plate 55 to additionally compress the spring 102 and thereby produce increasing resistance to movement of the valve sleeve 105, which resistance is progressively induced in accordance with the distance the movable wall PA is moved as a measure of the pressure being exerted by said movable wall on the brake fluid in the hydraulic brake system (not shown). It should be importantly noted here that during energization of the vacuum-motor VM, the spring 102 reacts only on the spring seat 95 and valve sleeve 105 which prevents power-loss that would result should the movable wall PA be required to overcome the force of this spring as is common practice in prior art devices.

Intermediately spaced with respect to the cavities in the aforesaid segments 128, 129 and the rear ends of the circular walls thereof, is a semicircular internal groove 145 which in the assembled status of the housing segments produces an internal annular groove 146 which receives the outer half-diameter in cross section of a split round wire retainer ring 147, and the inner half-diameter thereof engages a circularly aligned external annular groove 148 in the outer cylindrical surface of the valve sleeve 105 to lock the valve housing segments against relative axial displacement with respect to said sleeve.

Each of the segments 128, 129 is provided with an indentation or notch 150 in the rear end of the circular walls thereof and diametrically disposed in their assembled status on the valve sleeve 105. These notches register with correspondingly disposed ports 151 through the wall of the valve sleeve whereby the atmospheric valve chamber 121 communicates continuously with the power cylinder atmospheric chamber 46.

The power cylinder end wall 34 is provided with a circular opening 154 coaxial with the openings in the forward end wall 11 and associated plates aforesaid, said opening 154 terminates in an outturned circular flange 155 which is radially closed inwardly into an external annular groove 156 formed in the outer cylindrical surface of a bearing or support collar 157 to make the collar fast on the end wall 34. The interior of the collar is provided with an inner counterbore 158 in coaxial disposition with respect to a longitudinal bore 159 to provide an annular shoulder 160 therebetween, the bore 159 serving as a bearing support for the rearwardly projecting portion of the valve sleeve 105 exterior of the valve housing VH best demonstrated in FIGURE 2. Shoulder 160 is engageable by the rear ends of the valve housing segments 128, 129 aforesaid to establish the main control valve mechanism CV in its normally released position. Another external annular groove 161 is provided on the collar 157 rearwardly spaced from the groove 156 for receiving the annular forward end retaining bead 162 of a conventional flexible dust boot B.

The free end 165 of the push rod PR projects through a reduced diameter bead 166 terminating the opposite end of said boot B into the bore 108 in the valve sleeve 105 to engage the thrust wall 109 whereby movement of the pedal P is transmitted via the push rod PR to actuate the valve sleeve 105 relatively to the valve piston 106, and as a unit with the latter upon the relative operating movement of the main control valve mechanism CV being fully taken up as a consequence of the working face 143 engaging the plate 56 to provide a "straight through" application of operator input effort on the movable power assembly PA to assist the maximum output effort of the latter to apply the brakes.

A rigid vacuum-inlet tube 170 projects through the cylindrical wall of casing 41 at 171 (see FIGURE 1), the inner projecting portion 172 receives the end of substantially a convolution of flexible conduit 173 and the other end of said conduit is attached to the tube 141 in the lower valve housing segment 129 whereby vacuum inlet to the arcuate cavity 135 thereof and relative movement of the control valve sleeve 105 with respect to the movable wall PA are provided. One end of another flexible conduit 175 is connected to the free end of an elbow-type tube 176 having its other end secured to and projecting through the plates 55, 56 in continuous communication with the power chamber 45 aforesaid and, the other end of the last-mentioned conduit being connected to the upper tube 141 whereby the cavity 135 in the upper housing segment 128 is connected to said power chamber and relative movement between the movable power assembly PA and control valve sleeve 105 also provided thereby. That portion of the tube 170 which projects to the exterior of the casing 41 receives one end of a third flexible conduit 178 and the other end of this latter conduit is connected, for example, to the interior of the engine-inlet manifold (not shown), thereby completing the vacuum line connection to the main control valve mechanism CV.

An air filter device of conventional construction is provided at AF (see FIGURE 1) and which is press-fitted or otherwise secured in an opening 180 through the cylindrical wall of the power cylinder casing 41 for venting the power cylinder chamber 45 to atmosphere via chamber 46, and for filtering out any foreign particles, moisture, etc., from entering said chambers with consequent involvement of the working parts within the booster motor VM. This filter device further serves to silence ingress of air when the vacuum-motor VM is being operated to released position in response to removing pressure from the pedal P and wherein the motor vehicle brakes are taken "off" as is understood.

Figure 6:
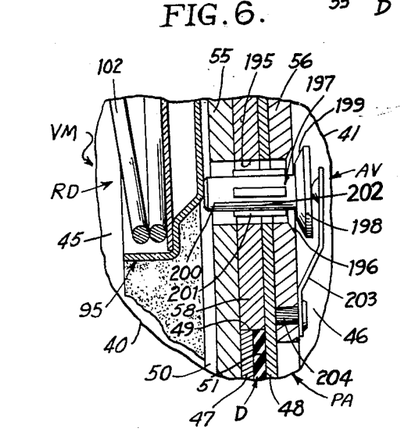
FIGURE 6 is a fragmentary view of FIGURE 2 showing the vacuum relief valve on an enlarged scale for clarity of detail.

The auxiliary or vacuum relief control valve AV comprises a longitudinal circular passageway 195 radially offset from the axis of the main control valve CV, and which extends through the plates 55, 58, 56 in that order to normally place the power cylinder chambers 45, 46 in communication with each other when open, thereby balancing pressures on opposite sides of the power member PA. The end of this passageway on the plate 56 terminates in an annular preferably flared valve seat 196 as shown. A poppet-type valve element 197 is movably disposed in the passageway and provided with a head 198 having a complemental face 199 for engaging the said valve seat to close said passageway. Projecting from the head through the passageway is a stem 200 having a plurality of elongated radially disposed fins 201 of substantially the same overall diameter as the passageway to slidably support the valve element in engaging alignment with its valve seat aforesaid, said fins providing longitudinal spaces 202 therebetween to enable air flow through the passageway when open. The stem operably engages the confronting portion of the back of the spring seat member 95 in normal disposition as shown in FIGURE 2 to move the head of the valve element 197 away from its cooperating seat and thus connect the chambers 45, 46 so that pressures on opposite sides of the movable power member PA are balanced. The length of the stem 200 is such that upon movement of the spring seat member 95 away from the thrust plate 55, under influence of the pedal P, that the poppet valve engages the seat 196 to isolate the chambers 45, 46 from each other thereby conditioning the movable power member PA to be subject to differential pressures on opposite sides thereof induced by opening the main control valve CV after the poppet valve 197 has been seated. It should be noted in this connection that the valve sleeve 105 and spring seat member 95 move simultaneously and the timing of the opening of the control-slot 111 to evacuate the power chamber 45 of air is such that this latter operation transpires as or after the poppet valve closes in the manner explained above, otherwise, air in the power chamber 45 could not be evacuated to create such differential pressures under control of the main control valve CV since chamber 45 would be connected to atmosphere via chamber 46. Stated differently, the poppet valve must be closed before the main control valve CV can be effective, even though open, to energize the vacuum-motor VM. This poppet valve may be termed a "vacuum-relief" or "auxiliary valve" since its purpose is to place both chambers of the power cylinder VM in communication with atmosphere upon removal of foot pressure from the pedal P at any applied position thereof, to enable the return springs aforesaid and pressure on the brake fluid to effect quick return of the mechanism to brake "off" position irrespective of the rate of withdrawal of the foot from the pedal whereby the operating parts associated with the pedal keep pace with it toward fully released position. In this way, a slowed brake release is prevented thus making it possible to apply and release the brakes as rapidly as conditions require. Of course, the control-slot 111 could be made wider and deeper in the valve sleeve 105 with the valve working land 117 proportionately widened to accommodate a more rapid ingress of air into the power chamber 45 when taking the brakes "off" but such would act adversely to a smooth sensitized control of the booster motor VM in relation to the shortest possible pedal travel requirement to effect operation of the main control valve CV. Accordingly, the poppet valve serves as an auxiliary air inlet to the power chamber 45 in cooperation with the "off" position of the main control valve CV so that release of the vehicle brakes occurs in synchronism with the rate of removal of foot pressure from the pedal P; but if the main control valve CV is slowly released, ingress of air via the control-slot 111 into the power chamber 45 enables the retraction of the operating parts simultaneously with pressure removed from the pedal as is understood. In either case, however, venting of both motor chambers 45, 46 to atmosphere by the poppet valve at full release of the pedal pressure assures that the operating parts are fully established in their respective released positions wherein the master cylinder compensating port is fully uncovered for the fluid to properly adjust in the hydraulic system. Partial evacuation of the power chamber 45 tends to draw the poppet valve head 198 toward its seat by the air pressure effective on the opposite side of the head and thus seal off the chamber 45 from the chamber 46, however, a normally pretensioned flat leaf spring 203 is provided with one end anchored as by a drive pin 204 on the plate 56 and the other end overlying the valve head to react thereagainst to insure seating of the head when the stem 200 is released by movement of the spring seat member 95 away from the thrust plate 55 as shown in FIGURE 6 where slight clearance obtains between the end of the stem and vertical wall of the spring seat member 95. Closed condition of the relief valve must coincide with the "lapped" position of the working land 117 and control-slot 111 to enable holding the brakes "on."

The support collar 157 is further provided with a radial passageway 207 which is flared at its outer end, and the inner end of which intersects an internal annular channel 208 formed in the bore 159. An oil saturated ring-type wick 209 is carried in this channel in encircling relation with respect to the exposed exterior cylindrical surface of the valve sleeve 105, to provide lubrication for this surface and the surface of the bore 159. A flat 210 having a shoulder 211 is provided in the outer surface of the valve sleeve 105 which communicates with the wick 209 in the normally released disposition of the control valve mechanism CV shown in FIGURE 2, said flat having continuous communication with the upper air port 151 whereby ingress of air through this port induces the lubricant suspended in the wick to move toward said air port and thence into the interior of the sleeve to lubricate the valve piston 106. The aforesaid shoulder which terminates the rear end of the flat 210 tends to wipe the lubricant from the wick during sliding movement of the sleeve 105 relative to the collar 157 which wiping action cooperates with the air flow into the interior of the valve sleeve 105 to place at intervals small quantities of lubricant near the port 151 so that it may be drawn into the interior of the sleeve. In this manner an efficient lubricating system is provided for the working parts aforesaid by simply introducing periodically a small quantity of oil as by the spout of an oil can engaging the flared end of the passageway 207, to maintain the wick saturated. Over lubrication is prevented by the control-slot 111 and bottom air port 151 which drain off excess oil, the port 151 conveying such excess to the atmospheric chamber 46 of the vacuum-motor VM, and any excess oil reaching the cavity in the lower valve housing via control-slot 111 when the main control valve CV is disposed as shown in FIGURE 2, would be drawn into the vacuum valve chamber 118 when the motor is energized with consequent lubrication of both of the valve lands, and any excess lubricant in the vacuum chamber would ultimately reach the engine inlet-manifold (not shown) under influence of vacuum and dissipated in the combustion chambers of the engine as is understood.

*Operation*

Figure 1:
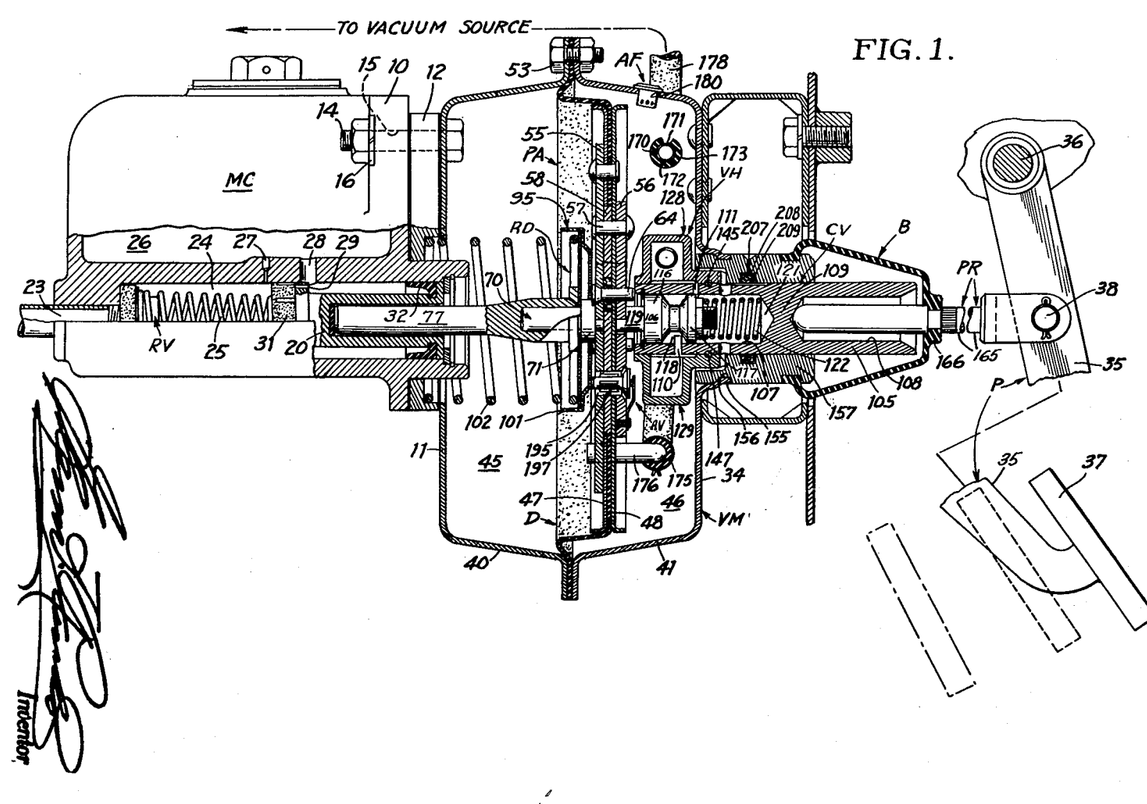
FIGURE 1 is a longitudinal vertical section of a brake booster motor incorporating control valve mechanism constructed in accordance with the present invention, said motor being exemplarily illustrated in operative association with the master cylinder in a hydraulic brake system conventionally employed on automotive vehicles or the like, and wherein said valve mechanism is in its closed (off) disposition.

The operation of my improved follow-up control valve mechanism CV will be apparent from the foregoing description but may be summarized as follows:

Assuming that the valve sleeve and piston 105, 106 respectively of the main control valve CV are in their normally released positions as shown in FIGURES 1 and 2 wherein the vacuum-power and atmospheric chambers 45, 46 respectively are vented to atmosphere via air filter device AF thereby balancing pressures in said chambers for power-inactivation of the booster motor VM, said power chamber 45 being vented via the elbow fitting 176, conduit 175, tube 141, cavity 135 in valve segment 128, passageway 139, control-slot 111, atmospheric valve chamber 121, ports 151, notches 150, atmospheric chamber 46 and the air filter AF, and, as previously stated, the chamber 46 is in continuous communication with the atmosphere via the said air filter device. Also the vacuum relief valve AV is in open disposition as shown in FIGURES 1, 2 and 6 thereby cooperating with the control-slot 111 in the main control valve CV in normally released position to unrestrictedly accommodate free flow of air between the motor chambers 45, 46 to balance the pressure therein. Accordingly, the booster motor VM and related parts including the movable power assembly PA therein are in their respective normally released positions as shown in FIGURES 1 and 2 in readiness for a brake-applying cycle.

With the engine running, sub-atmospheric (negative) pressure is produced within the intake-manifold (not shown) which is conveyed through conduit 178, tube 170, conduit 173, tube 141, cavity 135 in valve segment 129, and vacuum slot 110 to evacuate the air from the vacuum valve chamber 118 on the valve piston 106 which conditions the main control valve CV for operation to control operative energization of the vacuum-motor VM.

Figure 7:
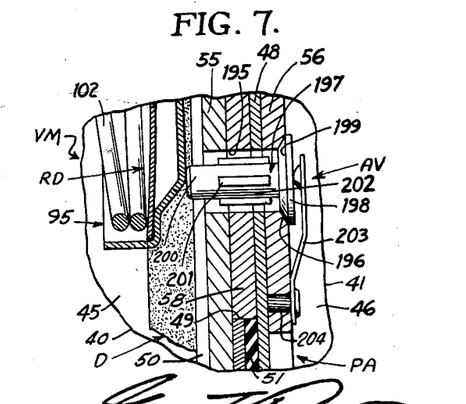
FIGURE 7 is a fragmentary view of FIGURE 5 showing the vacuum relief valve on an enlarged scale for clarity of detail.

Initial depression of the pedal P to its first dashed line position in FIGURE 1 simultaneously moves the valve sleeve and piston 105, 106 respectively, power member PA, plunger 77 to the positions shown in FIGURE 7 wherein the master cylinder MC generates resistance to further movement of the above components as a unit effected by the initial operator force on the pedal P transmitted to said parts by the valve spring 122 without modulating the preloaded status of the latter. Upon the operator applying increased pressure to the pedal against said resistance following such initial application thereof, the valve sleeve 105 is displaced relatively to the valve piston 106 from normal "off" position, which relative displacement is accommodated by yielding of the valve spring 122 induced by the resistance of the master cylinder fluid-displacing parts reacting on the plunger 77. The said relative displacement being provided by the predeterminately spaced normal disposition of the working face 143 on the valve housing VH with respect to the power member PA best demonstrated in FIGURE 2, it being recalled that the forward extension 119 on the valve piston 106 projects through the opening 68 in the thrust plate 56 into abutting relation with the plate 48 forming part of the power assembly PA whereby the valve piston 106 moves as a unit with the power asesmbly under influence of the valve spring 122 at all operating positions of the main control valve CV. When this latter condition prevails, which corresponds to the relative disposition aforesaid of the valve sleeve 105 with respect to the power assembly PA, the main and auxiliary control valves CV and AV respectively may be said to be fully closed or "off," that is to say, the motor chambers 45, 46 are interconnected and vented to atmosphere via said air filter device AF to establish equivalent pressures therein. The aforesaid relative movement of the valve sleeve 105 moves the control-slot 111 into increasing exposure with respect to the vacuum valve chamber 118 after first cutting off communication of this slot from the atmospheric valve chamber 121 thereby inducing evacuation of air from the power chamber 45 via the tube 176, conduit 175 and connected arcuate cavity 135 in the upper half 128 of the valve housing VH, control-slot 111 and vacuum chamber 118.

During relative movement of the valve sleeve 105 to place the main control valve CV in operating position, the spring seat member 95 moves conjointly with said sleeve due to the interconnecting pins 64, thus withdrawing said spring seat member from the end of the poppet stem 200 to enable the poppet head 198 to engage the seat 196 under influence of some pressure differential and the normally preloaded leaf-spring 203. This seating operation of the poppet valve 197 establishes closed condition of the auxiliary air valve AV and is so timed with the opening of the main control valve CV that the poppet valve becomes seated during the "lapped" position of the working land 117 on the valve piston 106 with respect to the control-slot 111 to enable the establishment of negative pressure in the power chamber 45 to thus produce differential pressures in the chambers 45, 46 for power-activation of the booster motor VM.

It is thus seen that closure of the air control valve AV is so synchronized with the opening of the main control valve CV that the power chamber 45 is placed under control of the latter valve during power-activation of the booster motor VM, but upon release of operator force from the pedal P, the booster motor VM becomes inactivated as a consequence of the valve elements 105, 106 returning to their normal "off" positions shown in FIGURES 1 and 2 under influence of springs 102 and 122. This normalizing of the main control valve CV enables the spring seat member 95 to assume its normal disposition shown in FIGURES 1 and 2 under influence of spring 102, and wherein this member engages the poppet valve stem 200 and thus operates the same to unseat the poppet head and thereby interconnect the motor chambers 45, 46 via the passageway 195, and the control-slot 111 in the sleeve 105 to restore balanced pressure conditions within said chambers and thereby inactivate the booster motor VM.

It is important to note here that the main control valve CV is characterized by a unitary construction completely independent of the power assembly PA which it controls. This independent disposition being provided by novel slidable support of the valve unit on a portion of the motor casing, by utilizing that portion of the valve sleeve 105 exposed rearwardly of the valve housing VH, and which is acted on by the pedal P, thereby providing unison and relative sliding movements of the main valve elements 105, 106 to effect a sensitized follow-up action thereof in synchronism with the vacuum relief valve AV, and the ever present reaction from spring 102, and spring 122 as well, to oppose operation of the pedal P, contributes to a very smooth and efficient operation of the control valve mechanism CV in accordance with the operator force applied to the pedal.

The manually adjustable element 123 against which the valve spring 122 reacts, provides different preloaded settings of said spring so that pedal force may be varied in accordance with the initial work-load reacting thereagainst whereby a relatively soft or hard pedal is available during the initiatory thrust-transmitting operation, thus eliminating the necessity, and cost as well, of having to install a new set of spring conditions for each particular pedal "feel" as may be desired by the driving public. Thus, for example, if spring 122 is installed under a preloaded weight of 20#, all that is required to obtain a harder pedal is to withdraw the nut 123 from the working land 117 to the extent necessary to induce the desired pretension in said spring. A shim washer of the proper thickness may be inserted between the valve land 117 and adjusted position of the nut 123 to provide a definite position of the nut for each setting thereof corresponding to the preloaded weight at which the spring is desired to operate.

Figures 3, 4, 8:
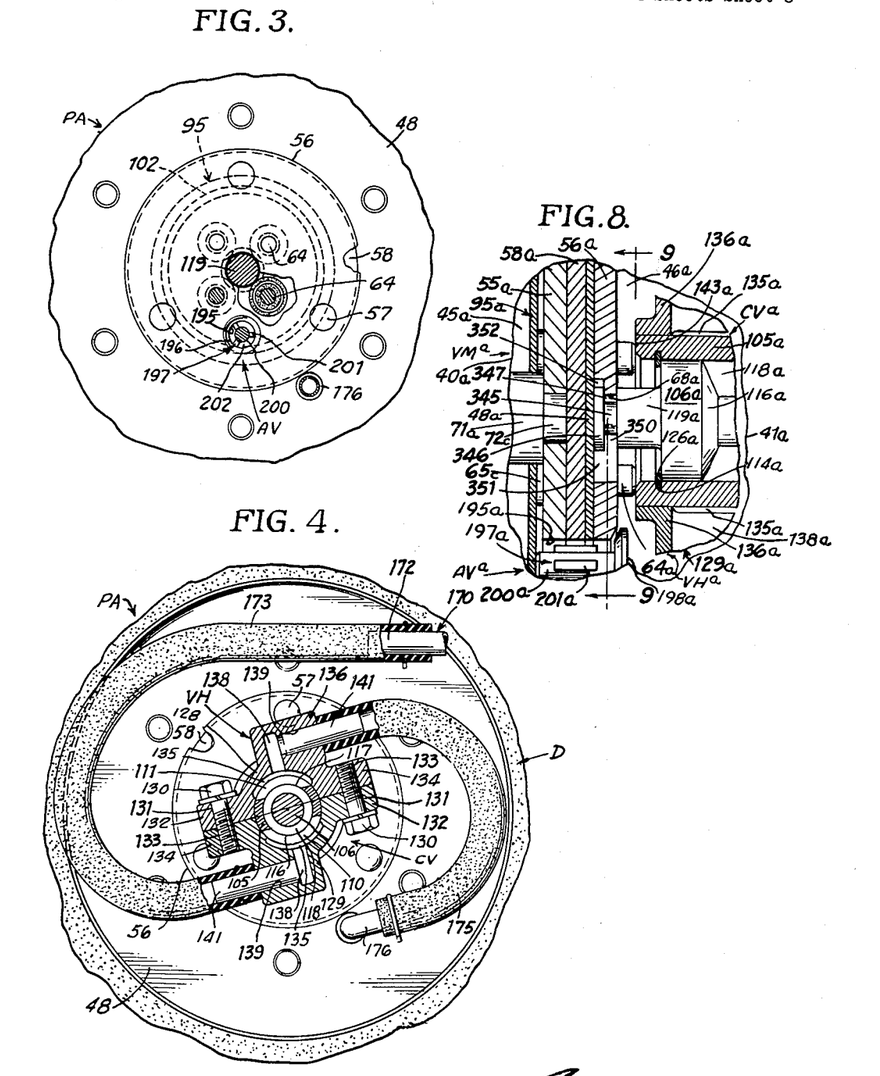
FIGURE 3 is a transverse sectional view taken on a reduced scale along the line 3—3 of FIGURE 2, and showing details of the auxiliary vacuum relief valve.
FIGURE 4 is another transverse sectional view taken on a reduced scale along the line 4—4 of FIGURE 2, and showing further details of the novel valve structure and associated flexible conduit connections leading to the exterior of the motor casing and to the vacuum-power chamber via the power member.
FIGURE 8 illustrates a modified form of the control valve mechanism wherein the inner valve piston is mechanically connected to the power member for axial movement as a unit, said coupling accommodating relative radial displacement between these two components.

*Mechanical Coupling Between the Power Member and Control Valve Piston and Operation Thereof Figures 8 and 9*

This modification incorporates in the vacuum booster VM<sup>a</sup> mechanical means for coupling the control valve piston 106a to the power diaphragm plate 56a to move axially as a unit while accommodating limited relative radial displacement therebetween to avoid critical and rigid coaxial relationship thereof. The structure comprising this novel coupling means includes an integral reduced diameter circular extension 345 which terminates in an annular outstanding flange 346 at the inner end of the extension 119a on the valve piston 106a, to provide an annular space 347 therebetween. The confronting end of the opening 68a is closed by a wall 348 provided with a radially disposed opening or slot 349 therethrough slightly wider than the diameter of the extension 345 open at its inner end, and of a length slightly longer than the radius of the opening 68a. Intersecting the perimeter of hole 68a and the inner end of the slot 349 is a circular hole 350 through the plate 56a of slightly larger diameter than the flange 346, the intersecting points on the perimeter aforesaid merging with the circumference at the full diameter of the hole 350 to provide an opening 351 through the wall 348 encircling the opening 68a to enable the flange 346 to slide into the space 352 between the plate 48a and wall 348 into coaxial disposition with respect to the axis of the power assembly PA<sup>a</sup>. To attach the valve piston 106a which includes the entire main control valve CV, the flange 346 is inserted through the hole 350 into alignment with the space 352 which places the marginal portions of the slot 349 in line with the space 347. The flange 346 is now ready to be radially moved into coaxial disposition with respect to the opening 68a which operation, when completed, disposes the forward end of the valve piston 106a in engagement with the marginal portion of the slot 349 thereby coupling the main control valve CV and plate 56a to move axially as a unit.

It is thus seen that this novel coupling arrangement enables the valve piston 106a and therefore the main control valve assembly CV to be detachably connected to the power member PA<sup>a</sup>, thereby providing easy assembly and disassembly of the main control valve CV independently of the pressure-responsive unit PA<sup>a</sup>. This coupling also insures exactness of the follow-up movement between the valve sleeve 105a and piston 106a at all relative positions thereof in controlling the operation of the vacuum-motor VM<sup>a</sup> since under no circumstances can the valve piston 106a become axially separated from the power diaphragm thrust plate 56a.

The present invention contributes two principal novel combinations over the prior art, and over the control valve mechanism disclosed in my copending application Serial No. 684,946, earlier filed on September 19, 1957, as follows:

(1) The combination of the disclosed auxiliary control valve AV and the main control valve CV; and (2) The combination of the disclosed air control valve AV and the vacuum control function only of the main control valve CV.

In the first combination, the air control valve AV serves as an auxiliary valve to the air control function of the main control valve CV; while, in the second combination, the air control function of the main control valve CV is eliminated by permanently isolating the control-slot 111 from the atmospheric valve chamber 121, thus placing full control of the induction of air into the power chamber 45 on the auxiliary control valve AV. The aforesaid isolation of the control-slot 111 being effected by widening the working land 117 sufficiently to maintain said slot covered when the sleeve and piston elements 105, 106 respectively are disposed in normal "off" positions as shown in FIGURE 2.

Should the source of pressure fail or become inadequate, the operator can effect "straight-through" assist or full operation of the plunger 77 directly, by merely applying sufficient force on the pedal P to bring the inner end of the valve housing VH and/or sleeve 105 into engagement with the confronting surface portion on the thrust plate 56. In this disposition of the main control valve CV, the full relative operating movement thereof has been taken up.

Moreover, it should be manifest that spring 102 continuously reacts on the valve sleeve 105, but only on the power assembly PA in a releasing direction thereby utilizing the full pressure differential force in the booster motor VM for operation of the plunger 77 rather than, as in prior art control valve mechanisms, dissipate some of the power force in overcoming the reaction from return spring that continuously reacts on the power-piston or diaphragm as the case may be.

A further noteworthy feature in the present valve mechanism CV is the provision of the usual operating relationship of the valve working land 117 and control slot 111 wherein there is provided the "off," "lapped," and "on" positions of control, the "lapped" position being effective to stabilize the power assembly PA in any operating position by maintaining substantially a uniform force on the pedal P at such operating position whereby the valve mechanism may be held "lapped" with minimum operator force to maintain the energized status of the booster motor VM at the given position of the pedal. In this conection, it should be pointed out that when the main control valve CV is "lapped" as explained above, the auxiliary control valve AV is seated to isolate the two motor chambers 45, 46 as is understood.

It is important to note that the reaction device RD serves the important function of transmitting reaction from the master cylinder MC to the valve sleeve 105, said reaction being induced by operation of the device to operating position under influence of initial operator force applied to the pedal P prior to operative energization of the booster motor VM, to condition the master cylinder to pressurize the fluid therein and thereby provide resistance (work-load) to movement of the plunger 77 reacting on the valve mechanism CV thus causing the spring 122 to yield with consequent relative movement of the valve sleeve 105 and spring seat member 95 with respect to the valve piston 106 and poppet element 197 respectively under increasing force on the pedal P by the operator. During such conditioning operation aforesaid, the spring 102 progressively increases its tension on the spring seat member 95 and valve sleeve 105 connected to the pedal P, to supplement the reaction from the master cylinder via the reaction device RD. The latter spring serves the important function of continuous reaction on the valve sleeve 105, and on the power assembly PA in a releasing direction only, in the manner previously described.

Figure 5:
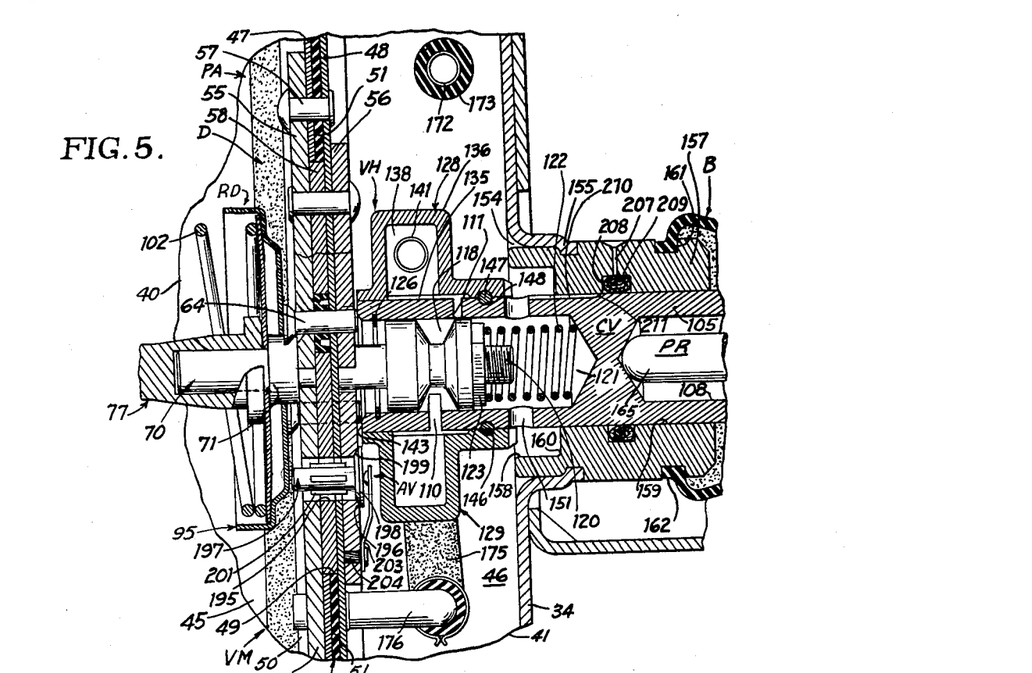
FIGURE 5 is a sectional view similar to FIGURE 2 on substantially the same scale showing the parts in their respective operated positions corresponding to valve open (on) position to inaugurate operative energization of the booster motor.

Accordingly, it is seen that initial operator force applied to the pedal P actually operates the reaction device RD and the master cylinder piston to positions wherein these two components are conditioned to perform their respective functions upon the booster motor VM becoming energized as a consequence of increasing force on the pedal P after such initial application thereof. Therefore, the present invention discloses a definite and requisite cooperative relationship between the booster motor VM and master cylinder MC actuated thereby for the motor to attain an operative status as well as the master cylinder. Neither of these two principal components can carry out their respective functions until initial operator force has been applied to the pedal P to dispose the reaction device RD and the master cylinder in operating positions corresponding substantially to FIGURE 5.

The simplicity and economy of the disclosed main control valve mechanism CV and its independent mounting, if desired, within the motor casing enable servicing without having to replace part or all of the associated power assembly PA controlled thereby, makes it most desirable as a control means for pressure differential operated motors utilized to operate in part motor vehicle brakes and/or steering apparatus characterized by a follow-up sequence of control between an operator-operated member and a power-activated member, and wherein the operator member is operable to automatically effect a "straight-through" application of operator force on the device controlled in part by such motors.

Although the embodiments of my invention disclosed herein are well calculated to fulfill the objects stated, it will be understood that I do not wish to be limited to the exact construction and/or arrangement of parts shown, since it is evident that modifications, variations, changes and substitutions may be made therein without departing from the proper scope or fair meaning of the subjoined claims.

Having thus described my invention, I claim:

1. In a control valve mechanism adapted to control a power member movable from normal position to perform work under influence of a pressure differential, said mechanism having a pair of complementary valve elements, one of which is displaceable relatively to the other, a source of pressure different from atmosphere communicating with one of said valve elements, a fluid chamber between said valve elements in continuous communication with said source, an atmospheric chamber coaxially disposed with respect to said fluid chamber between said valve elements, a working land on the other of said valve elements cooperating with a control port in the one valve element to selectively connect said port to said fluid chamber and to said atmospheric chamber, a fluid connection between said port and power member, a normally preloaded spring reacting between said valve elements to establish the same in a relative normal position, another normally preloaded spring reacting continuously on said one valve element only to assist the first named spring in establishing the valve mechanism in said normal position in cooperation with said first-named spring, means on the other valve element in continuous follow-up engagement with the power member, a support extension fixed with respect to said power member for slidably receiving a portion of said one valve element whereby both of said valve elements are operatively mounted as a unit independently of said power member, a pair of normally engaged abutment-engaging portions on said valve elements respectively to define their normal relative position, another pair of normally spaced abutment-engaging portions on said one valve element and power member respectively for defining the relative displacement of said valve elements out of normal position, an operator-operated member adapted to act directly on said one valve element to effect said relative displacement thereof in opposition to the two springs aforesaid, the resistance provided by said work to movement of said power member under initial operator-actuation thereof as a unit with said valve elements in said normal relative position as a function of the thrust-transmitting capacity of the first-named spring in normally preloaded status to oppose such unitary movement, produces said relative displacement accommodated by yielding of said first-named spring under additional operator-actuation of said one valve element, the improvement which comprises: an auxiliary air control valve having an element displaceable from normally open position to closed position in synchronism with said one valve element under influence of said additional operator-actuation to render said relative displacement control by said complementary valve elements effective; and a third normally preloaded spring operatively associated with said air control valve element for biasing the same toward its closed position.

2. A control valve mechanism constructed in accordance with claim 1 including a threaded cylindrical extension projecting coaxially from one end of the other valve element into the atmospheric chamber aforesaid; and a manually rotatable element threadedly engaging said extension into normally engaged relation with the one end of said valve element for receiving reaction from the first-named spring operably disposed within said atmospheric chamber whereby the preloaded status of said spring may be varied in accordance with the axially adjusted position of said rotatable element.

3. In a control valve mechanism adapted to control a power member movable from normal position to perform work under influence of a pressure differential, said mechanism having an inner valve element and an outer valve element telescopically-related and relatively displaceable for controlling operation of said power member, a pair of coaxially disposed bores formed respectively in opposite ends of the outer valve element with one of said bores receiving the inner valve element in airtight sealed relation thereto, a thrust wall separating the inner ends of said coaxial bores, an atmospheric valve chamber disposed between the thrust wall and confronting end of the inner valve element, an annular vacuum chamber disposed between said valve elements in coaxial relationship with respect to said atmospheric chamber, a fluid opening in the outer valve element interconnecting a pressure source with said vacuum chamber, a port in the outer valve element interconnecting said atmospheric chamber with the atmosphere, a fluid-control opening in the outer valve element normally communicating with the atmospheric chamber, a pair of cooperating abutment-engaging portions provided respectively on said power member and outer valve element for defining relative displacement of said valve elements, another pair of cooperating abutment-engaging portions provided respectively on said valve elements for defining the relative normal position thereof, a normally preloaded spring operably disposed within said atmospheric valve chamber to react between said thrust wall and confronting end of the inner valve element to bias them apart to said normal relative position and accommodate their relative displacement toward each other within the limits defined by said pair of abutment-engaging portions on said outer valve element and power member respectively, an extension on said inner valve element in continuous engagement with said power member to provide unitary movement thereof under influence of the first-named spring, another normally preloaded spring reacting continuously on the outer valve element in cooperation with said first-named spring to establish the normally released position of said valve mechanism, tubular conduit means for interconnecting one side of the outer valve element with said source of pressure, and the opposite side thereof to the power member aforesaid whereby relative displacement of one of the valve elements with respect to the other and to the power member is accommodated, a stationary member, an operator-operated member adapted to act directly on the thrust wall in the outer valve element to effect said relative displacement thereof, the resistance provided by said work to movement of said power member as a unit with said valve elements effected as a function of the preloaded status of said first-named spring generated in response to initial operator-actuation, induces said relative displacement of the outer valve element upon additional operator-actuation of the latter, complemental means on the valve mechanism and said stationary member for slidably supporting the former as a unit independently of the power member, the improvement which comprises: an auxiliary air control valve having an element displaceable from normally open position to closed position in synchronism with said outer valve element under influence of operator-actuation to establish differential pressures on opposite sides of said power member to activate the same; a third normally preloaded spring operatively associated with said air control element for biasing the same toward its closed position; and mechanically interconnecting means between said outer valve element and the air control element to effect synchronous movement of said two last-named elements.

4. A control valve mechanism constructed in accordance with claim 3 wherein said tubular conduit means comprise: a flexible conduit having one end communicating with the outer valve element and the other end connected to the power member, and another flexible conduit interconnecting the said one side of the outer valve element with said source of pressure.

5. A control valve mechanism constructed in accordance with claim 3 wherein the said two openings in the outer valve element are longitudinally spaced in diametrically disposed relationship through the wall thereof in continuous communication with axial bore in the inner end thereof, said openings cooperating with a pair of longitudinally spaced annular lands on the inner valve element to define said annular vacuum chamber therebetween whereby said vacuum chamber is in continuous communication with said fluid opening connected to said source of pressure, and one of said annular lands is adapted to selectively control communication of the fluid-control opening with said vacuum chamber and with said atmospheric chamber in response to relative displacement of the outer valve element with respect to the inner valve element.

6. A control valve mechanism constructed in accordance with claim 5 including a valve housing mounted on said outer valve element to produce a unitary assembly, said valve housing comprising: a sleeve segment telescopically disposed on the outer valve element in airtight sealed relationship therewith; a pair of diametrically disposed cavities in the inner cylindrical surface of said sleeve segment, one of said cavities having continuous communication with the first-named opening in the outer valve element connected to said source of pressure, and the other cavity having continuous communication with the fluid-control opening in said outer valve element; a pair of radially aligned oppositely disposed embossments integral with said sleeve segment; a passageway in each of said embossments in communication respectively with each of said cavities; another passageway in each of said embossments intersecting respectively the first-named passageways whereby said first-named opening and the fluid-control opening are connected to said source of pressure and to the power member respectively.

7. A control valve mechanism constructed in accordance with claim 6 wherein said sleeve segment comprises: two semicircular sections with each section incorporating one of said cavities and one of said embossments; a pair of oppositely disposed flanges integral with each of said sections, said two pairs of flanges having complemental confronting surfaces flush with the ends of the semicircular sections; a pair of registering holes through each pair of confronting flanges, one of said pair of holes being threaded and the other unthreaded; and a cap screw projecting through the unthreaded hole into threaded engagement with the registering threaded hole in each pair of flanges to clamp both sections in airtight sealed relation on the outer valve element to produce a unitary assembly thereof.

8. In a control valve mechanism adapted to control a power member movable from normal position to perform work under influence of a pressure differential, said mechanism having an inner valve element and an outer valve element telescopically-related and relatively displaceable slidably supported as a unit independently of said power member on a stationary member for controlling operation of said power member, a pair of coaxial bores formed respectively in the outer and inner ends of the outer valve element with the inner bore adapted to slidably receive the inner valve element in airtight sealed relation, a thrust wall separating the inner confronting ends of said coaxial bores, an annular vacuum chamber disposed between said valve elements, a fluid opening in the outer valve element interconnecting a source of negative pressure with said vacuum chamber, an atmospheric valve chamber disposed between said thrust wall and confronting end of the inner valve element, a port in the outer valve element interconnecting said atmospheric chamber with the atmosphere, a fluid-control opening in the outer valve element normally communicating with the atmospheric valve chamber, a pair of cooperating abutment-engaging portions provided respectively on said valve elements for defining the relative normal position thereof; another pair of cooperating abutment-engaging portions provided respectively on the outer valve element and said power member for defining relative displacement of said valve elements, a normally preloaded compression spring reacting between the inner valve element and said thrust wall to establish the normal relative position of said valve elements, another normally preloaded compression spring continuously reacting on the outer valve element in cooperation with said first-named spring to establish the normal position of said valve mechanism, a mechanical connection between the movable power member and inner valve element adapted to connect them for axial movement as a unit in both directions, an inner annular working land on said inner valve element defining one end of said annular vacuum chamber, for selectively connecting the fluid control opening in the outer valve element to atmosphere and to said vacuum valve chamber to control operative energization of the power member, said working land being normally disposed with substantially half of the fluid-control opening communicating with the atmospheric valve chamber, an operator-operated member adapted to act directly on said thrust wall in the outer valve element to displace the same relatively to said inner valve element as a function of resistance generated by said work to oppose movement of said power member as a unit with said valve elements under influence of initial operator-actuation of the outer valve element transmitted through the first-named spring in pre-loaded status to the inner valve element, the improvement which comprises: an auxiliary control valve operatively mounted on the power member in radially offset disposition with respect to the axis thereof, said auxiliary valve having an element movable to open and closed positions with respect to a passageway through said power member, whereby the air control of the valve mechanism is expedited in synchronism with movement of said outer valve element; a third normally preloaded spring operatively associated with the valve element of said auxiliary valve to bias the same to its normally open position when the valve mechanism is normalized; and another mechanical connection between said outer valve element and element of said auxiliary valve to effect said synchronous movement thereof under influence of operator-actuation of said outer valve element in a normalizing direction.

9. In a control valve mechanism adapted to control the movable wall of a fluid pressure-activated motor, a pair of cooperating valve elements movable relatively at a plurality of closely spaced stations defining the full operating stroke of said wall to control movement of the latter in response to follow-up movement of an operator-operated member from and toward a normal position thereof, a normally preloaded spring reacting between said pair of valve elements to establish a normal relative position thereof, a fixed member, another normally preloaded spring continuously reacting between said fixed member and one of said pair of valve elements to bias the latter toward said normal position in cooperation with said first-named spring, the improvement which comprises: a passageway through said wall normally open to balance pressures on opposite sides of said wall; an auxiliary control valve including an element spring-biased to a position closing said passageway to isolate said opposite sides of said wall to enable differential pressures to be effective thereon under control of relative movement of said pair of valve elements from their normal position at each of their stations aforesaid in response to operator member movement from its normal position; and a movable mechanical connection between said one valve element and the spring-biased element of said auxiliary valve enabling unitary movement thereof against said spring bias relative to the other of said pair of valve elements, to a different position opening said passageway thus cooperating with said pair of valve elements to balance pressures on opposite sides of said wall upon relative movement of said pair of valve elements effecting said normal position thereof at each of their stations aforesaid in response to operator member movement toward its normal position under joint influence of the two springs aforesaid.

10. In control valve mechanism adapted to control a power member movable from a normal position to perform work under influence of a pressure differential and an operator-operated member having follow-up movement from a normal position to control said power member, the improvement which comprises: a pair of cooperating telescopically-related spring-loaded elements coaxially disposed with respect to the axis of said power member, said elements being adapted to render said pressure differential effective to move said power member upon relative displacement from their normal position under operator-actuation of one of said elements; a passageway through said power member normally open to balance pressures on opposite sides thereof, said passageway being offset radially from the axis of said power member; a third spring-biased element movably associated with said passageway in synchronism with one of said pair of elements, to normally open said passageway; a fixed member; a normally preloaded spring continuously reacting between said fixed member and said one element of the pair of elements, in cooperation with the spring load on the latter elements to establish the normal position of all three valve elements wherein said pair of elements cooperate with said third element moved against its spring bias with respect to said passageway to open the same and thereby balancing pressures on opposite sides of said power member; and mechanical means interconnecting said one element of the said pair of elements with said third element to enable synchronous movement thereof relative to the other element of said pair of elements to augment the reaction from said last-mentioned spring in accordance with the effective operating position of said operator member from its normal position.

11. In a control valve mechanism adapted to control a power member movable to perform work under influence of a pressure differential and an operator-operated member having normally released positions respectively, the improvement which comprises: a pair of telescopically-related cooperating elements coaxially disposed with respect to the axis of said power member in operative follow-up association therewith to control the same, said elements being relatively displaceable from normal pressure balancing position with respect to said power member, to operating position whereat pressure differential is effective on opposite sides of said power member to move the same from normal position, in response to operator-actuation of one of said pair of elements; a normally proloaded spring reacting between said valve elements to establish the normal position thereof; a passageway through said power member normally open to cooperate with the pressure balancing position of said pair of elements, said passageway being offset radially from the axis of said power member; a third spring-biased valve element movably associated with said passageway in synchronism with said one valve element, to normally open said passageway against said spring bias; a fixed member; another normally preloaded spring continuously reacting on said fixed member and said one valve element, to produce progressively increasing resistance to movement of the latter element during relative displacement of said pair of valve elements in accordance with the effective operating position of the operator member from its normal position, said last-mentioned spring opposing the spring bias on said third valve element and cooperating with said first-mentioned spring to establish the normal position of all three valve elements to effect said pressure balance; and mechanical means interconnecting said one valve element with said third valve element to enable synchronous movement thereof relative to the other of said pair of valve elements to augment said resistance from said last-mentioned spring.

12. In control valve mechanism adapted to control a fluid pressure-activated motor having a fluid chamber enclosure and a movable wall dividing said chamber into opposing fluid pressure chambers, and a source of pressure different from atmosphere, the improvement which comprises: a pair of interfitting valve elements coaxial with said wall, and normally blocking communication between one of said opposed chambers and said source; a passageway through said wall adapted to normally interconnect said opposed chambers to balance pressures therein when said pair of elements is in blocking position; a third valve element operatively associated with said passageway to open and close the same, said last-named valve element being spring-biased to closed position wherein said opposed chambers are isolated from each other in synchronism with said pair of valve elements relatively displaced to interconnect said source with said one opposed chamber to establish differential pressures in said opposed chambers, and being operable to open position against its spring bias in synchronism with said pair of valve elements operated to normal blocking position to balance pressures in said opposed chambers; mechanical means interconnecting one of said pair of valve elements with said third valve elements to move as a unit relatively to the other of said pair of valve elements; a normally preloaded spring reacting between said pair of valve elements to bias them toward normal blocking position; another normally preloaded spring continuously reacting on a portion of said chamber enclosure and said one valve element, to produce progressively augmented resistance to movement of the latter element during relative displacement of said pair of valve elements; and an operator-operated member for effecting relative displacement of said pair of valve elements in opposition to said spring between said pair of valve elements.

References Cited in the file of this patent

UNITED STATES PATENTS

| | | |
|---|---|---|
| 2,152,084 | Paine | Mar. 28, 1939 |
| 2,331,238 | Schnell | Oct. 5, 1943 |
| 2,517,005 | MacDuff | Aug. 1, 1950 |
| 2,972,339 | Randol | Feb. 21, 1961 |